United States Patent [19]

Braune

[11] 4,037,678
[45] July 26, 1977

[54] VEHICLE CHASSIS STRUCTURE

[76] Inventor: Rudi Helmut Braune, Griffin Hill, Thrupp, Stroud, Glouchestershire, England

[21] Appl. No.: 594,293

[22] Filed: July 9, 1975

[30] Foreign Application Priority Data

July 12, 1974 United Kingdom ............... 30936/74

[51] Int. Cl.² .................. B62K 5/06; B62K 11/02
[52] U.S. Cl. ..................................... 180/11; 280/287
[58] Field of Search .................. 180/11, 12, 13, 14 R, 180/14 A, 14 E, 16; 280/760, 767, 769, 278, 287

[56] References Cited

U.S. PATENT DOCUMENTS

| 607,325 | 7/1898 | Barnes | 280/287 |
|---|---|---|---|
| 2,636,568 | 4/1953 | Rutishauser | 180/12 X |
| 3,207,253 | 9/1965 | Branning | 180/14 R X |
| 3,253,668 | 5/1966 | Tantlinger | 180/11 |
| 3,359,012 | 12/1967 | Westerheide | 280/287 |
| 3,854,542 | 12/1974 | Jesswein et al. | 180/12 |
| 3,854,755 | 12/1974 | Tang | 280/278 |
| 3,866,945 | 2/1975 | Bingham | 280/209 X |
| 3,885,807 | 5/1975 | Bradbury et al. | 280/767 X |

FOREIGN PATENT DOCUMENTS

| 1,097,434 | 2/1955 | France | 180/13 |
|---|---|---|---|
| 990,197 | 9/1951 | France | 180/12 |
| 375,613 | 4/1964 | Switzerland | 180/12 |

Primary Examiner—Joseph F. Peters, Jr.
Assistant Examiner—Jack D. Rubenstein
Attorney, Agent, or Firm—Hill, Gross, Simpson, Van Santen, Steadman, Chiara & Simpson

[57] ABSTRACT

A vehicle chassis is formed from front and rear wheeled chassis units, the front unit providing the steering and the rear unit the drive. The units are connected together by flanges which provide a load-bearing function and are further connected together by studs on the rear unit passing through slots in the front unit, the studs being secured by nuts. In this way the longitudinal coupling of the units is separated from the load-bearing coupling.

3 Claims, 6 Drawing Figures

VEHICLE CHASSIS STRUCTURE

The invention relates to chassis for vehicles, and more particularly to chassis having load-bearing releasable mechanical couplings between two parts of a chassis.

An important field of application of the invention is that in which it is desirable to make a vehicle chassis in two main parts, for ease of manufacture, standardisation of components, servicing, and rapid replacement or interchange of chassis units.

According to the invention there is provided a vehicle chassis comprising first and second chassis units supported on respective independent rolling means, one of the chassis units being provided with steering means for the rolling means of such unit, and means for coupling the first and second chassis units releasably to one another, wherein the coupling means comprises a first coupling member and a first load-bearing member associated with he first unit and a second coupling member and a second load-bearing member associated with the second unit, the members being arranged such that upon interconnection of the coupling members the load-bearing members are brought into load-bearing engagement with one another.

A chassis is thus provided having a releasable load-bearing coupling between two, for example back and front, chassis units in which the means for effecting the coupling includes coupling members which perform solely a retaining function and need not perform any load-bearing function, such function being performed by the load-bearing members.

Preferably, the coupling members are rigid, and may require for their engagement a relative tilting movement about an axis parallel to the axis of the rolling means, with the coupling members being arranged to prevent disengagement caused by reversal of this movement.

The first load-bearing member may comprise at least one transversely-extending support flange and at least one retaining flange spaced vertically above the support flange, the flanges being integral with, or secured to, the first chassis unit, and the second load-bearing member may then comprise a coupling flange integral with, or secured to, the second chassis unit for fitting between said at least one support and retaining flanges.

One or both rolling means may conveniently comprise one or a pair of wheels.

Examples of a chassis in accordance with the invention will now be described, by way of example, with reference to the accompaying drawings, in which.

Figure 1:
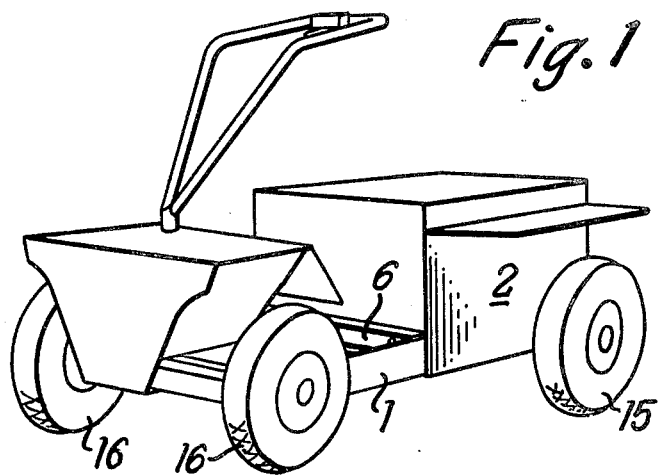
FIG. 1 is a perspective view of a four wheeled vehicle having front and rear chassis units coupled together.
Figure 2:
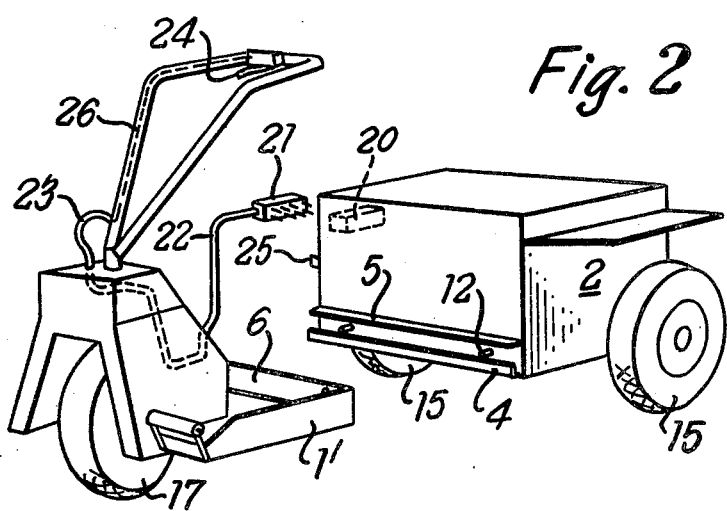
FIG. 2 is a similar view of a tricycle vehicle having front and rear chassis units shown uncoupled.

In FIG. 1 the front and rear chassis units are indicated by the general references 1 and 2, and are mounted on a pair of wheels 16 and 15 respectively. In FIG. 2 the chassis units are similarly indicated, the front chassis being carried by a steerable wheel 17.

Figure 3:
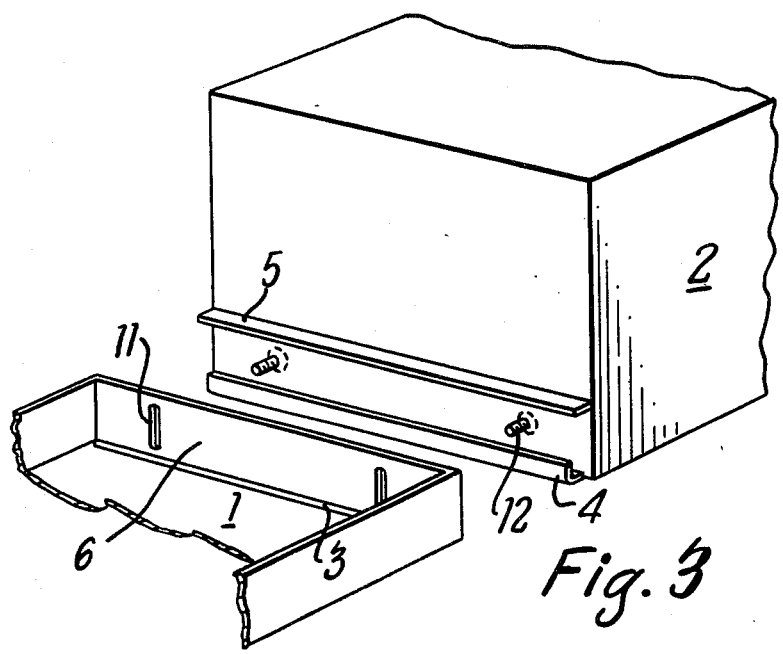
FIG. 3 shows a releasable chassis coupling of FIGS. 1 and 2 in perspective on a larger scale.
Figure 5:
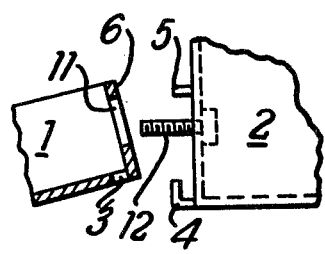
FIG. 5 is a detail of FIG. 3 partly in section showing two coupling members just before engagement; and, FIG. 6 shows the coupling of FIG. 5 engaged.
Figure 6:
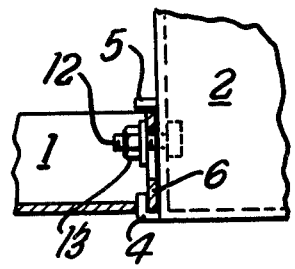

In the coupling of FIGS. 3, 5 and 6, a support flange 4 of right angle section is integral with, or welded to, the structure of the chassis unit 2, and a retaining flange 5 is fixed above and parallel to flange 4. The front chassis unit 1 has a slot 3 for engagement by the support flange 4, and a coupling flange 6 of vertical height to allow a clearance between the support flange 4 and retaining flange 5.

In use, the front chassis unit 1 is offered to the rear chassis unit 2 whilst tilted about the axis of the front wheels 16. The unit 1 is then lowered such that the support flange 4 engages the longitudinal slot 3, and clamping studs 12 fixed to unit 2 pass through oppositely placed vertical slots 11 in the coupling flange 6. Nuts 13 are then fitted to the studs 12 so as to clamp the flange 6 (FIG. 6), and the front and rear chassis units 1 and 2 are thus secured together. It follows that the coupling cannot be released until the clamping nuts 13 have been removed. In this arrangement no shearing stress is imposed on the clamping studs 12, which perform solely a clamping, and not a load-bearing, function when the coupling is in use. The load-bearing function is performed by the flange 6 and the flange 4.

Figure 4:
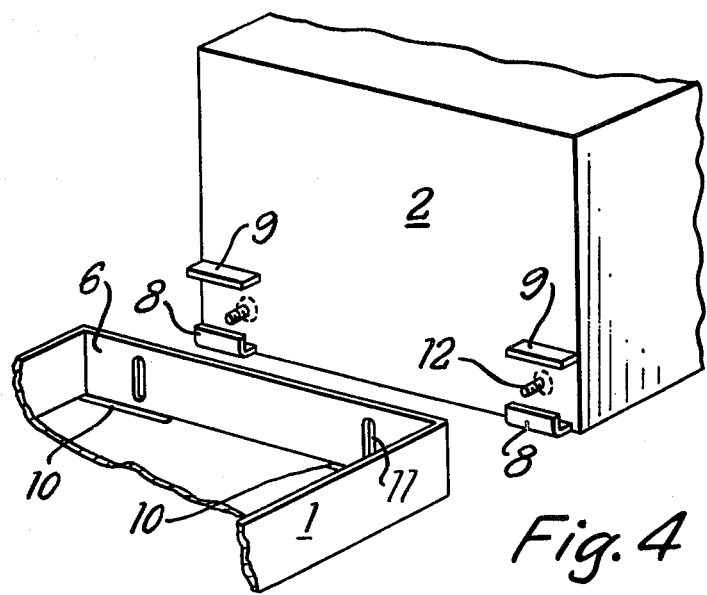
FIG. 4 shows an alternative coupling to that of FIG. 3, on a similar scale.

In the modification of FIG. 4, the same principle is employed, but with pairs of short support flanges 8, and short retaining flanges 9 fixed to the unit 2 in place of the elongate flanges 4 and 5 of FIG. 3. The clearance slots 10 in unit 1 are of corresponding length. Engagement of the coupling is achieved by the operation described above with reference to FIGS. 5 and 6.

It is evident that engagement of the coupling, in either case, can be effected by limited tilting of either one or both of the units 1 and 2 about its wheel axis. The unitary coupling allows rapid replacement, and interchange of the front two wheeled chassis unit 1 of FIG. 1 with the front single wheeled unit 1' of FIG. 2. Although the flanges 4, 5, 8 and 9 and studs 12 are shown as attached to the rear chassis unit 2, and the slots 11 and flange 6 are shown on part of the front chassis unit 1 or 1', it is envisaged that these parts of the coupling could be interchanged with each other.

Furthermore, the studs 12 may be replaced by bolts, and may then engage with holes in line with the bolts.

the vehicles shown in FIGS. 1 and 2 are battery powered, the power unit and drive being housed in the rear chassis unit 2, although the drive force may be provided by any other suitable means. Rapid making and breaking of the necessary electrical control circuits extending between the front and rear units is provided for by the multiple plug and socket coupling as shown.

In FIG. 2 a multiple-terminal outlet socket 20 is housed within the rear chassis unit 2 and is connected internally by cable cores, not shown, to the various electrical components, including e.g., battery, motor reversing contactors, transistor power control module, lamps, direction indicators. A corresponding multiple plug box 21 is carried by the front chassis unit 1' on a flexible multicore cable harness 22, part of which is looped at 23, to provide slack in cable for executing steering movements. Appropriate cores of the plug cable are taken via the hollow steering pillar at 26 to a control lever 24 on the tiller, and other cores to various components in the front chassis unit 1'. When the chassis units are assembled a part of the cable harness may be held by clips, such as 25.

What I claim is:

1. In a vehicle having first and second chassis units supported on respective independent rolling means, one of said chassis units being provided with steering means for the rolling means of said unit, and means releasably coupling sad first and second chassis units to each other, wherein the improvement comprises one of said chassis units having a horizontally disposed planar base member, and a planar end wall mounted in perpendicular abutment therewith and provided with a plurality of vertically elongated apertures, said planar base member and said end wall being arranged to define therebetween at least one elongated horizontal aperture, and wherein the other of said chassis units has a vertical end wall, at least one support flange mounted on said vertical end wall and arranged to pass through said at least one elongated horizontal aperture and to support said planar end wall of said one unit, and horizontaly disposed threaded clamping means mounted on said vertical end wall, said clamping means extending through said vertically elongated apertures of said planar end wall of said one unit, cooperatively threaded means being provided to rigidly clamp said planar end wall of said one chassis unit and said vertical end wall of said other chassis unit in complete surface abutment with each other, and at least one further flange mounted on said vertical end wall of said other unit to extend horizontally therefrom to be supported on top of said planar end wall of said one chassis unit, whereby a secure contact between chassis units over a large surface area is obtained.

2. The vehicle of claim 1, wherein said at least one elongated horizontal aperture of said one chassis unit and said at least one flange of said other chassis unit extend all the way across said units.

3. The vehicle of claim 1, wherein at least one of said rolling means comprises at least one wheel.

* * * * *